F. S. CALLOWAY.
HOSE SUPPORTER.
APPLICATION FILED MAR. 28, 1914.
1,113,954.  Patented Oct. 20, 1914.
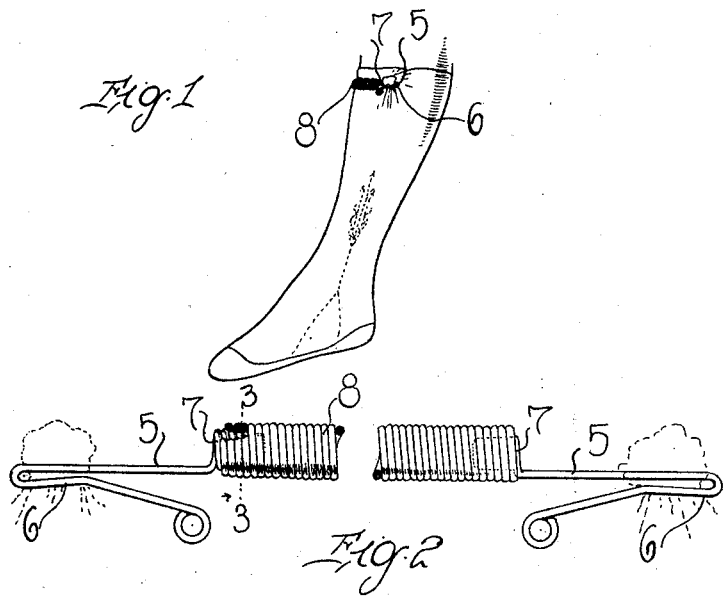
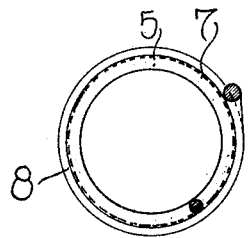
Witnesses
Robert M. Sutphen
A. L. King
Inventor
FRANK S. CALLOWAY
By Watson E. Coleman
Attorney
THE NORRIS PETERS CO., PHOTO-LITHO., WASHINGTON, D. C.

UNITED STATES PATENT OFFICE.

FRANK S. CALLOWAY, OF FAIRHAVEN, MASSACHUSETTS.

HOSE-SUPPORTER.

1,113,954.   Specification of Letters Patent.   Patented Oct. 20, 1914.

Application filed March 28, 1914. Serial No. 828,028.

*To all whom it may concern:*

Be it known that I, FRANK S. CALLOWAY, a citizen of the United States, residing at Fairhaven, in the county of Bristol and State of Massachusetts, have invented certain new and useful Improvements in Hose-Supporters, of which the following is a specification, reference being had to the accompanying drawings.

This invention relates to new and useful improvements in hose supporters, and an object thereof is to dispense with the employment of elastic textile material from which the usual hose supporter is constructed.

A further object of this invention is the provision of a hose supporter by means of which the hose will be held tightly around the leg of the wearer, without any portion of the supporter engaging the leg above the hose.

My invention consists in the novel construction, combination, and arrangement of parts to be hereinafter more fully described, claimed, and illustrated in the accompanying drawing, in which, Figure 1 is an elevational view of my improved supporter showing the same in a position for use; Fig. 2 is an enlarged elevational view, partly in section, showing the manner of connecting one of the clasps to the connecting member; and Fig. 3 is a section on the line 3—3 of Fig. 2.

Referring more particularly to the drawing, the numeral 5 designates a pair of clasps which are constructed of spring wire, one end of each wire being bent backwardly upon the body portion thereof as at 6, to form the engaging portion of the clasp, the opposite end of the wire of each clasp being coiled as at 7. A connecting member 8 is provided, consisting of a coiled spring wire, the member being preferably annular in cross-section and the bore thereof being of substantially the same diameter as the diameter of the coiled portions 7 of the clasp.

The wire composing the connecting member 8 is relatively of less diameter than the diameter of the wires forming the clasps 5, and the coiled portions 7 of the clasps are adapted for insertion into the opposite ends of the bore of the connecting member, the convolutions of the connecting member being adapted for frictional engagement between the convolutions of the coiled portions of the clasps, to prevent accidental disengagement of the clasps from the connecting member. It will, of course, be understood that one of the clasps may be connected to the hose and the other clasp may be connected to the under garment, so that the hose will be supported in the proper manner upon the leg. It will also be understood that any desired form of clasp which is provided with a coiled end may be used with the connecting member, and that the coiled portions of the clasps and the coiled connecting member may be oval-shaped in cross-section or any other desired shape.

Having thus fully described my invention, what I desire to secure and claim by Letters Patent, is:—

A hose supporter comprising a pair of wire clasps, one end of the wire of each of the clasps being coiled, and a coiled wire connecting member, said connecting member being of slightly greater diameter than the coiled portions of the clasps, the convolutions of the clasps being adapted for engagement within the opposite ends of the connecting member and to engage between the convolutions thereof, the convolutions of the clasps and the convolutions of the connecting member being disposed at the same angle with relation to the common longitudinal axis of the coiled portions of the clasps and the connecting member, whereby the clasps may be readily removed from or attached to the connecting member by the turning of the same with relation to the member.

In testimony whereof I hereunto affix my signature in the presence of two witnesses.

FRANK S. CALLOWAY.

Witnesses:
LEONARD R. PARKINSON,
WILLIAM I. FITZSIMMONS.

Copies of this patent may be obtained for five cents each, by addressing the "Commissioner of Patents. Washington, D. C."